United States Patent
Moniz et al.

(10) Patent No.: US 9,397,905 B1
(45) Date of Patent: Jul. 19, 2016

(54) AGGREGATED HEALTH CHECK OF A MULTI-TENANT SERVICE CONTAINER

(71) Applicant: Amazon Technologies, Inc., Seattle, WA (US)

(72) Inventors: Samuel Leonard Moniz, Seattle, WA (US); Kevin Michael Beranek, Seattle, WA (US); Keian Christopher, Seattle, WA (US); Jun Xu, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 219 days.

(21) Appl. No.: 14/163,883

(22) Filed: Jan. 24, 2014

(51) Int. Cl.
*H04L 29/08* (2006.01)
*H04L 12/26* (2006.01)
*H04L 12/24* (2006.01)

(52) U.S. Cl.
CPC ............ *H04L 43/04* (2013.01); *H04L 12/2634* (2013.01); *H04L 29/08099* (2013.01); *H04L 29/08675* (2013.01); *H04L 41/5003* (2013.01)

(58) Field of Classification Search
CPC .............. G06F 17/30584; G06F 17/30994; G06F 21/41; G06F 9/50; H04L 63/20; H04L 12/2634; H04L 29/08099; H04L 29/08675; H04L 41/5003; H04L 43/04
See application file for complete search history.

(56) References Cited

U.S. PATENT DOCUMENTS

| | | | |
|---|---|---|---|
| 9,053,167 B1* | 6/2015 | Swift | G06F 17/30584 |
| 2014/0068732 A1* | 3/2014 | Hinton | G06F 21/41 726/6 |
| 2014/0075017 A1* | 3/2014 | Wang | G06F 9/50 709/224 |
| 2014/0081925 A1* | 3/2014 | Haeberle | G06F 17/30994 707/692 |
| 2015/0135255 A1* | 5/2015 | Theimer | H04L 63/20 726/1 |

* cited by examiner

*Primary Examiner* — Le H Luu
(74) *Attorney, Agent, or Firm* — Lee & Hayes, PLLC

(57) ABSTRACT

A multi-tenant service container receives a container health check request and responsively identifies a list of expected tenants. The list of expected tenants may include all of the tenants hosted by the multi-tenant service container, all of the tenants hosted by the multi-tenant service container that are associated with a particular process or a list of tenants defined by the container health check request. The multi-tenant service container issues a tenant health status request to the tenants in the expected tenant list and responsively receives a tenant health status from the tenants. The received tenant health status is either a tenant healthy status or a tenant unhealthy status. The multi-tenant service container issues a container health status based on the tenant health statuses received from the tenants on the expected tenant list.

24 Claims, 5 Drawing Sheets

AGGREGATED HEALTH CHECK OF A MULTI-TENANT SERVICE CONTAINER

BACKGROUND

Various types of execution environments can be utilized to provide software services. For example, one type of execution environment is a multi-tenant service container. A multi-tenant service container can be configured to cohost a number of different tenants (e.g. services or applications). In some cases, all or a subset of the tenants cohosted by a multi-tenant service container execute within the same process.

A load balancer configured with a virtual Internet protocol address may operate as an intermediary between customers and one or more multi-tenant service containers. The load balancer may track the availability of one or more associated multi-tenant service containers to determine the availability of the services executing within the multi-tenant service containers. A multi-tenant service container may be considered unable to support customer requests for access to the services associated with a process if the multi-tenant service container that supports the requested process is unavailable or unhealthy, or if the tenants hosted by the multi-tenant service container that provide the services associated with the requested process are unavailable or unhealthy.

The disclosure made herein is presented with respect to these and other considerations.

DETAILED DESCRIPTION

Figure 1:
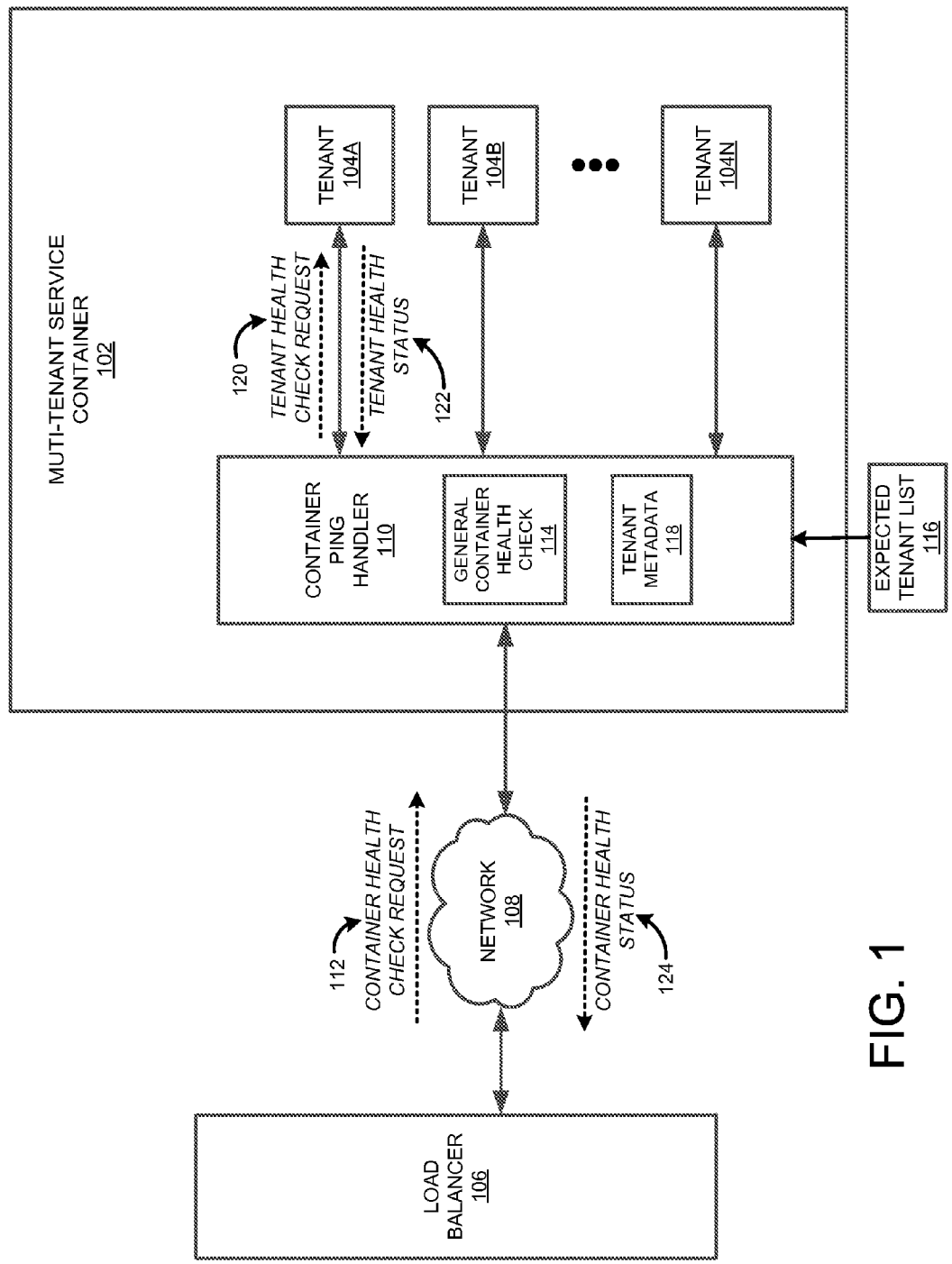
FIG. 1 is a software architecture diagram showing aspects of one illustrative mechanism described herein for performing an aggregated health check of a multi-tenant service container.

The following detailed description is directed to technologies for performing an aggregated health check of a multi-tenant service container. In order to provide this functionality, a load balancer may operate as an intermediary between client devices and one or more multi-tenant service containers. The load balancer may track the health status of one or more multi-tenant service containers associated with the load balancer to determine the availability of the use case supported by the multi-tenant service containers. Utilizing the technologies described herein, a multi-tenant service container performs an aggregated health check in response to a container health check request received from the load balancer and issues a container health status to the load balancer. If the issued container health status is a container healthy status, the multi-tenant service container is available for production network traffic. If the issued container health status is a container unhealthy status, the multi-tenant service container is unavailable for production network traffic. The load balancer will not route customer requests for access to services associated with a process if the multi-tenant service container that supports the requested services is unhealthy.

According to one aspect presented herein, a computer-implemented method is disclosed for performing an aggregated health check of a multi-tenant service container. In particular, the multi-tenant service container receives a container health check request from a load balancer. The multi-tenant service container determines whether the multi-tenant service container is configured for production network traffic. If the multi-tenant service container is not configured for production network traffic, the multi-tenant service container issues a container unhealthy status to the load balancer. The multi-tenant service container performs a general container health check. If the multi-tenant service container fails the general container health check, the multi-tenant service container issues a container unhealthy status to the load balancer.

If the multi-tenant service container is configured for production network traffic and passes the general container health check, the multi-tenant service container identifies an expected tenant list. The expected tenant list may include all of the tenants hosted by the multi-tenant service container, all of the tenants hosted by the multi-tenant service container that are associated with a particular use case or a list of tenants defined by the container health check request. The multi-tenant service container checks tenant health metadata associated with each of the tenants in the expected tenant list. A tenant may fail the tenant health metadata check if the tenant has more than one live release. If any one of the tenants on the expected tenant list fails the tenant health metadata check, the multi-tenant service container issues a container unhealthy status to the load balancer.

If none of the tenants in the expected tenant list fail the tenant health metadata check, the multi-tenant service container issues a tenant health check request to each of the tenants in the expected tenant list and receives a tenant health status from each of the tenants. The received tenant health status is either a tenant healthy status or a tenant unhealthy status. A tenant is considered to be unhealthy if the tenant fails a tenant ping health check. The multi-tenant service container issues a container health status based on the tenant health statuses received from the tenants on the expected tenant list. The multi-tenant service container issues a container healthy status to the load balancer if all of the tenant health statuses received from all of the tenants in the expected tenant list are tenant healthy statuses. The multi-tenant service container issues a container unhealthy status if at least one of the tenant health statuses received from the expected tenant list is a tenant unhealthy status.

According to another aspect presented herein, a computer-implemented method is disclosed for performing an aggregated health check of a multi-tenant service container. In particular, the multi-tenant service container receives a container health check request from a load balancer. The multi-tenant service container identifies an expected tenant list. The expected tenant list may include all of the tenants hosted by the multi-tenant service container, all of the tenants hosted by the multi-tenant service container that are associated with a particular use case or a list of tenants defined by the container health check request.

The multi-tenant service container creates a container status request/response object in response to the container health check request. The multi-tenant service container creates a tenant specific decorating request/response object based on the container status request/response object for a tenant in the expected tenant list. The multi-tenant service container isolates the underlying container status request/response object from the tenant specific decorating request/response object by resetting the internal status of the underlying container status request/response object. The multi-tenant service container sends the tenant specific decorating request/response object to the tenant and receives a processed tenant specific decorating request/response object from the tenant. The received processed tenant specific decorating request/response object indicates the tenant health status of the associated tenant. The tenant health status consists of either a tenant healthy status or a tenant unhealthy status. The multi-tenant service container repeats the process described above for each of the tenants in the expected tenant list.

The multi-tenant service container processes the container status request/response object based on an aggregation of the plurality of processed tenant specific decorating request/response objects and generates a container health status based on the processed container status request/response object. The multi-tenant service container issues a container healthy status to the load balancer if all of the tenant health statuses received from all of the tenants on the expected tenant list are tenant healthy statuses. The multi-tenant service container issues a container unhealthy status if at least one of the tenant health statuses received from the tenants on the expected tenant list is a tenant unhealthy status. Additional details regarding the various components and processes described above for performing an aggregated health check of a multi-tenant service container will be presented below with regard to FIGS. 1-5.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a software architecture diagram showing aspects of one illustrative mechanism described herein for performing an aggregated health check of a multi-tenant service container 102. It should be appreciated that multi-tenant service containers 102 are available for use in many development environments. For example, multi-tenant service containers 102 are commonly available that utilize the JAVA programming language from ORACLE CORPORATION. Examples of multi-tenant service containers 102 include, but are not limited to WEBSPHERE from IBM CORPORATION, SPRING FRAMEWORK from VMWARE CORPORATION, GUICE from GOOGLE CORPORATION, the PICOCONTAINER and PLEXUS projects from CODEHAUS, the FELIX, TOMCAT, TOMEE and GERONIMO projects from the APACHE SOFTWARE FOUNDATION, EQUINOX, GEMINI, JETTY and ECLIPSE from the ECLIPSE FOUNDATION, JBOSS from REDHAT CORPORATION, and GLASSFISH, WEBLOGIC, and FUSION from ORACLE CORPORATION. Although the embodiments disclosed herein are primarily presented in the context of a multi-tenant service container 102, the embodiments disclosed herein might also be utilized with other types of multi-tenant execution environments.

A multi-tenant service container 102 can be configured to cohost a number of different tenants 104A-104N. The tenants 104A-104N may be services, applications, or other types of program modules. In some cases, all or a subset of the tenants 104A-104N cohosted by the multi-tenant service container 102 provide services within a single process. In some cases, all or a subset or tenants 104A-104N cohosted by the multi-tenant service container 102 may support a number of interdependent processes.

A load balancer 106 may operate as an intermediary between the clients of the tenants 104A-104N of the multi-tenant service containers and one or more multi-tenant service containers 102. The load balancer 106 communicates with the multi-tenant service containers 102 via a network 108. The load balancer 106 tracks the availability of the associated multi-tenant service containers 102 to determine the availability of one or more tenants supported by the multi-tenant service containers 102. A multi-tenant service container 102 may be considered unable to support customer requests for access to the services associated with one or more requested tenants if the multi-tenant service container 102 that supports the requested process(es) is unavailable or unhealthy, or if one of the tenants 104A-104N hosted by the multi-tenant service container 102 that provides the use case associated with the requested tenants are unavailable or unhealthy.

In one embodiment, the multi-tenant service container 102 includes a container ping handler 110 and cohosts two or more tenants 104A-104N. One mechanism that the load balancer 106 uses to track the availability of a use case supported by a multi-tenant service container 102 is to issue a container health check request 112 to the multi-tenant service container 102 via the network 108. The load balancer 106 may issue the container health check request 112 to a multi-tenant service container 102 at a uniform resource identifier ("URI") on the multi-tenant service container 102. The container health check request 112 is received at the container ping handler 110. In response thereto, the container ping handler 110 performs an aggregated health check on the multi-tenant service container 102 in the manner described below.

Upon receipt of the container health check request 112, the container ping handler 110 determines whether the multi-tenant service container 102 is configured to handle production network traffic (e.g. actual requests for services supported by the tenants). If the container ping handler 110 determines that the multi-tenant service container 102 is not configured for production network traffic (e.g. a multi-tenant service container installed on a software development computer), the container ping handler 110 issues a container unhealthy status to the load balancer 106. In this way, the load balancer 106 will not route production network traffic to a multi-tenant service container 102 having a container unhealthy status.

The container ping handler 110 includes a general container health check module 114 that performs a general container health check of the multi-tenant service container 102. If the multi-tenant service container 102 fails the general container health check, the container ping handler 110 issues a container unhealthy status to the load balancer 106.

If the multi-tenant service container 102 is configured for production network traffic and passes the general container health check, the container ping handler 110 retrieves an expected tenant list 116. In one embodiment, the expected tenant list may be a list of all of the tenants 104A-104N cohosted by the multi-tenant service container 102. In another embodiment, the container health check request 112 may be associated with a specific use case supported by the multi-tenant service container 102. In such a case, the expected tenant list may be a list of the tenants 104A-104B cohosted by the multi-tenant service container 102 that support the use case associated with the container health check request 112. For example, the expected tenant list 116 may be a subset of all of the tenants cohosted by the multi-tenant service container 102. In another embodiment, the multi-tenant service container 102 may support a number of interdependent use cases and the expected tenant list 116 may include tenants that support one or more of the interdependent use cases. In another embodiment, the list of tenants in the expectant tenant list 116 may be defined by the container health check request 112. In one embodiment, the expected tenant list 116 may be supplied to the multi-tenant service container 102. In another embodiment, the expected tenant list 116 may be stored at the multi-tenant service container 102. Various mechanisms may be utilized to obtain the expected tenant list 116.

The container ping handler 110 checks tenant health metadata 118 associated with each of the tenants 104A-104B in the expected tenant list 116. A tenant 104A-104B in the expected tenant list 116 may fail the tenant health metadata check if the tenant 104A-104B has more than one live release. In another embodiment, a tenant 104A-104B in the expected tenant list 116 may fail the tenant health metadata check if the tenant 104A-104B is not hosted by the multi-tenant service container 102. If any one of the tenants 104A-104B on the expected tenant list 116 fails the tenant health metadata check, the container ping handler 110 issues a container unhealthy status to the load balancer 106.

If none of the tenants 104A-104B in the expected tenant list 116 fail the tenant health metadata check, the container ping handler 110 sequentially issues tenant health check requests 120 to each of the tenants 104A-104B on the expected tenant list 116. The tenants 104A-104B each responsively issue a tenant health status 122 back to the container ping handler 110. The tenant health status 122 issued by each of the tenants 104A-104B is either a tenant healthy status or a tenant unhealthy status. A tenant 104A-104B may issue a tenant unhealthy status if the tenant 104A-104B fails a tenant ping health check.

When the container ping handler 110 receives the tenant health statuses 122 from each of the tenants 104A-104B in the expected tenant list 116, the container ping handler 110 aggregates all of the received tenant health statuses 122 to generate a container health status 124. If all of the tenant health statuses 122 received from the tenants 104A-104B on the expected tenant list 116 are tenant healthy statuses, the container ping handler 110 issues a container healthy status to the load balancer 106. If at least one of the tenant health statuses 122 received from the tenants 104A-104B on the expected tenant list 116 is a tenant unhealthy status, the container ping handler 110 issues a container unhealthy status to the load balancer 106.

Figure 2:
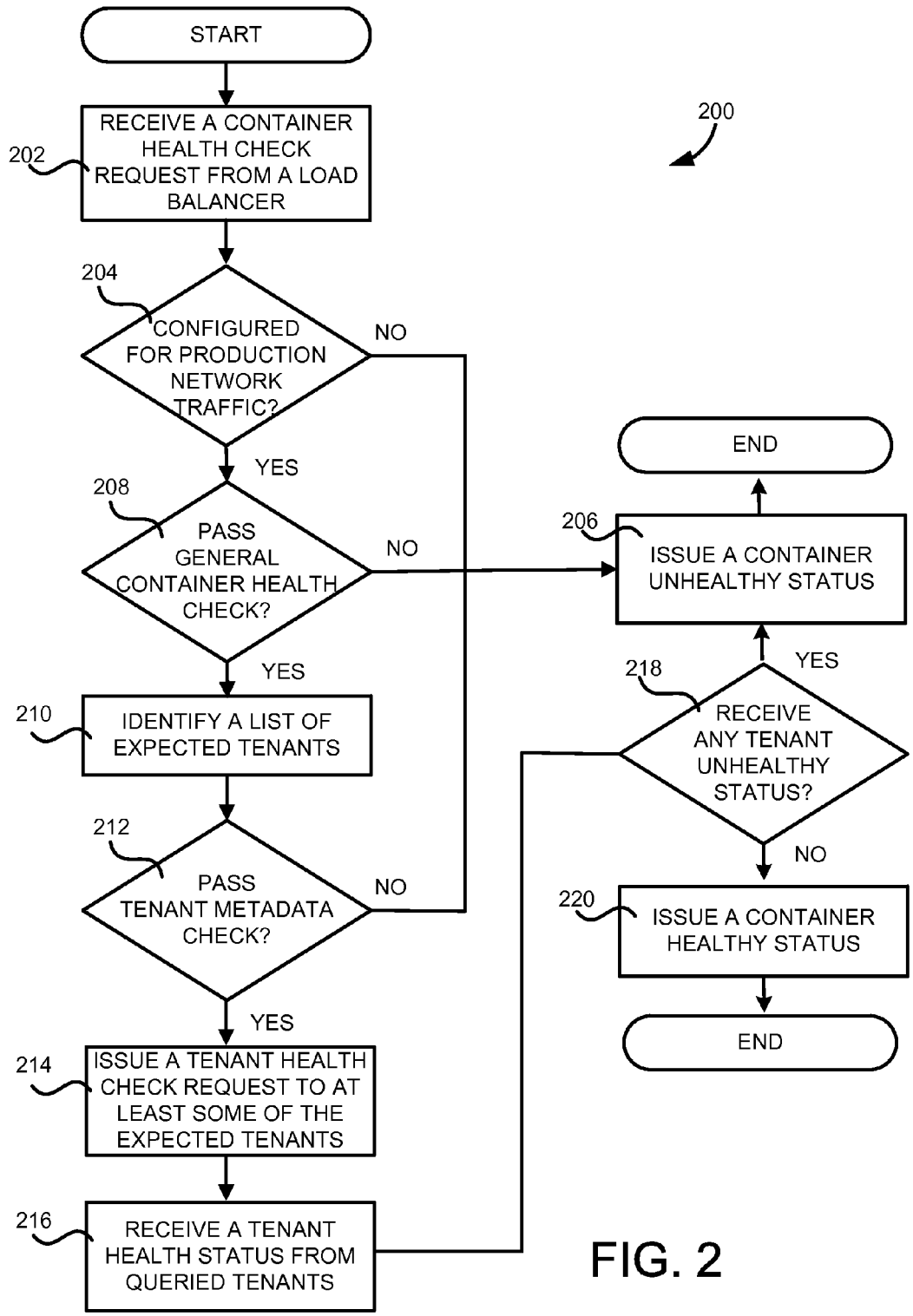
FIG. 2 is a flow diagram showing a routine that illustrates aspects of one mechanism disclosed herein for performing an aggregated health check of a multi-tenant service container.

FIG. 2 is a flow diagram showing a routine 200 that illustrates additional aspects of the mechanism shown in FIG. 1 for performing an aggregated health check of a multi-tenant service container 102. It should be appreciated that the logical operations described herein with respect to FIG. 2 and the other FIGS. are implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 200 begins at operation 202, where the multi-tenant service container 102 receives a container health check request 112 from a load balancer 106. The container health check request 112 is received at the container ping handler 110. The routine 200 then proceeds from operation 202 to operation 204, where the container ping handler 110 determines whether the multi-tenant service container 102 is configured for production network traffic.

If the container ping handler 110 determines that the multi-tenant service container 102 is not configured for production network traffic, the routine 200 proceeds from operation 204 to operation 206, where the container ping handler 110 issues a container unhealthy status to the load balancer 106. If the container ping handler 110 determines that the multi-tenant service container 102 is configured for production network traffic, the routine 200 proceeds from operation 204 to operation 208.

The container ping handler 110 includes a general container health check module 114. At operation 208, general container health check module 114 performs a general container health check of the multi-tenant service container 102. If the multi-tenant service container 102 does not pass the general container health check, the routine 200 proceeds from operation 208 to operation 206, where the container ping handler 110 issues a container unhealthy status to the load balancer 106. If the multi-tenant service container 102 passes the general container health check, the routine 200 proceeds from operation 208 to operation 210.

At operation 210, the container ping handler 110 identifies the expected tenant list 116 for the multi-tenant service container 102. As discussed above, in one embodiment the expected tenant list 116 may be a list of all of the tenants 104A-104N cohosted by the multi-tenant service container 102. In another embodiment, the container health check request 112 may be associated with a specific process supported by the multi-tenant service container 102. In such a case, the expected tenant list 116 may be a list of the tenants 104A-104B cohosted by the multi-tenant service container 102 that support the process associated with the container health check request 112. For example, the expected tenant list 116 may be a subset of all of the tenants 104A-104B cohosted by the multi-tenant service container 102. In another embodiment, the multi-tenant service container 102 may support a number of interdependent processes and the expected tenant list 116 may include tenants that support one or more of the interdependent processes. In another embodiment, the list of tenants 104A-104B in the expectant tenant list 116 may be defined by the container health check request 112. In one embodiment, the expected tenant list 116 may be supplied to the multi-tenant service container 102. In another embodiment, the expected tenant list 116 may be stored at the multi-tenant service container 102.

From operation 210, the routine 200 proceeds to operation 212 where the container ping handler 110 checks tenant health metadata 118 associated with each of the tenants 104A-104B in the expected tenant list 116. A tenant 104A-104B in the expected tenant list 116 may fail the tenant health metadata check if the tenant 104A-104B has more than one live release. In another embodiment, a tenant 104A-104B in the expected tenant list 116 may fail the tenant health metadata check if the tenant 104A-104B is not hosted by the multi-tenant service container 102. If any one of the tenants 104A-104B on the expected tenant list 116 fails the tenant health metadata check, the routine 200 proceeds from operation 212 to operation 206 where the container ping handler 110 issues a container unhealthy status to the load balancer 106. If all of the tenants 104A-104B on the expected tenant list 116 pass the tenant health metadata check, the routine 200 proceeds from operation 212 to operation 214.

At operation 214, the container ping handler 110 issues a tenant health check request 120 to each of the tenants 104A-104B on the expected tenant list 116. The routine 200 then proceeds from operation 214 to operation 216 where the container ping handler 110 receives a tenant health status 122 from each of the tenants 104A-104B in the expected tenant list 116. The tenant health status 122 is either a tenant healthy status or a tenant unhealthy status. The container ping handler 110 may receive a tenant unhealthy status from a tenant 104A-104B if that tenant 104A-104B fails a tenant ping health check.

The routine 200 then proceeds from operation 216 to operation 218. When the container ping handler 110 receives the tenant health statuses 122 from each of the tenants 104A-104B on the expected tenant list 116, the container ping handler 110 aggregates all of the received tenant health statuses 122 to generate a container health status 124. At operation 218, the container ping handler 110 determines whether any of the received tenant health statuses 122 is a tenant unhealthy health status. If all of the tenant health statuses 122 received from the tenants 104A-104B on the expected tenant list 116 are tenant healthy statuses, the routine 200 proceeds from operation 218 to operation 220, where the container ping handler 110 issues a container healthy status to the load balancer 106. If at least one of the tenant health statuses 122 received from the tenants 104A-104B on the expected tenant list 116 is a tenant unhealthy status, the routine 200 proceeds from operation 218 to operation 206 where the container ping handler 110 issues a container unhealthy status to the load balancer 106.

Figure 3:
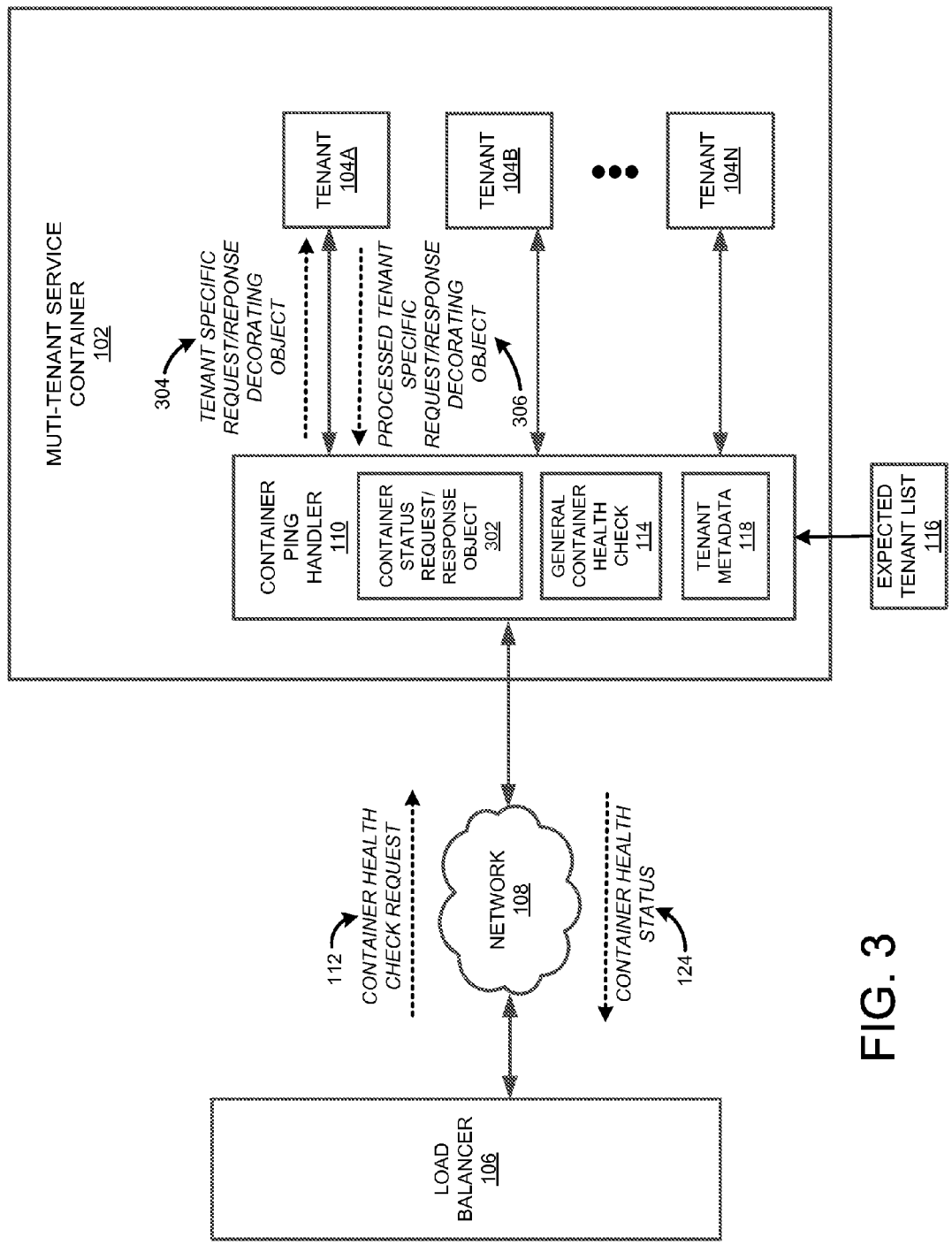
FIG. 3 is a software architecture diagram showing aspects of one illustrative mechanism described herein for performing an aggregated health check of a multi-tenant service container.

FIG. 3 is a software architecture diagram showing aspects of one illustrative mechanism described herein for performing an aggregated health check of a multi-tenant service container 102. A multi-tenant service container 102 can be configured to cohost a number of different tenants or applications 104A-104N. In some cases, all or a subset of the tenants 104A-104N cohosted by the multi-tenant service container 102 provide services within a single process. In some cases, all or a subset of the tenants cohosted by the multi-tenant service container 102 provide a number of interdependent processes.

As mentioned above, a load balancer 106 may operate as an intermediary between the clients of the tenants 104A-104N of the multi-tenant service containers and one or more multi-tenant service containers 102. The load balancer 106 communicates with the multi-tenant service containers 102 via a network 108. The load balancer 106 tracks the availability of the associated multi-tenant service containers 102 to determine the availability of one or more processes supported by the multi-tenant service containers 102. A multi-tenant service container 102 may be considered unable to support customer requests for access to the services associated with one or more requested processes if the multi-tenant service container 102 that supports the requested process(es) is unavailable or unhealthy, or if one of the tenants 104A-104N hosted by the multi-tenant service container 102 that provides the services associated with the requested process(es) are unavailable or unhealthy.

In one embodiment, the multi-tenant service container 102 includes a container ping handler 110 and cohosts two or more tenants 104A-104N. One mechanism that the load balancer 106 uses to track the availability of a process supported by a multi-tenant service container 102 is to issue a container health check request 112 to the multi-tenant service container 102 via the network 108. The load balancer 106 may transmit the container health check request 112 to a multi-tenant service container 102 at a URI on the multi-tenant service container 102. The container health check request 112 is received at the container ping handler 110. In response thereto, the container ping handler 110 performs an aggregated health check on the multi-tenant service container 102 in the manner described below.

Upon receipt of container health check request 112, the container ping handler 110 determines whether the multi-tenant service container 102 is configured to handle production network traffic (e.g. actual requests for services supported by the tenants). If the container ping handler 110 determines that the multi-tenant service container 102 is not configured for production network traffic (e.g. a multi-tenant service container installed on a software development computer), the container ping handler 110 issues a container unhealthy status to the load balancer 106. In this way, the load balancer 106 will not route production network traffic to a multi-tenant service container 102 having a default container unhealthy status.

The container ping handler 110 includes a general container health check module 114 that performs a general container health check of the multi-tenant service container 102. If the multi-tenant service container 102 fails the general container health check, container ping handler 110 issues a container unhealthy status to the load balancer 106.

If the multi-tenant service container 102 is determined to be configured to handle production network traffic and passes the general container health check, the container ping handler 110 retrieves an expected tenant list 116. In one embodiment, the expected tenant list may be a list of all of the tenants 104A-104N cohosted by the multi-tenant service container 102. In another embodiment, the container health check request 112 may be associated with a specific process supported by the multi-tenant service container 102. In such a case, the expected tenant list may be a list of the tenants 104A-104B cohosted by the multi-tenant service container 102 that support the process associated with the container health check request 112. For example, the expected tenant list 116 may be a subset of all of the tenants cohosted by the multi-tenant service container 102. In another embodiment, the multi-tenant service container 102 may support a number of interdependent processes and the expected tenant list 116 may include tenants that support one or more of the interdependent processes. In another embodiment, the list of tenants in the expectant tenant list 116 may be defined by the container health check request 112. In one embodiment, the expected tenant list 116 may be supplied to the multi-tenant service container 102. In another embodiment, the expected tenant list 116 may be stored at the multi-tenant service container 102. Various mechanisms may be utilized to obtain the expected tenant list 116.

The container ping handler 110 checks tenant health metadata 118 associated with each of the tenants 104A-104B in the expected tenant list 116. A tenant 104A-104B in the expected tenant list 116 may fail the tenant health metadata check if the tenant 104A-104B has more than one live release. In another embodiment, a tenant 104A-104B in the expected tenant list 116 may fail the tenant health metadata check if the tenant 104A-104B is not hosted by the multi-tenant service container 102. If any one of the tenants 104A-104B on the expected tenant list 116 fails the tenant health metadata check, the container ping handler 110 issues a container unhealthy status to the load balancer 106.

If all of the tenants 104A-14B pass the tenant health metadata check, the container ping handler 110 creates a container status request/response object 302 in response to the container health check request 112. The container ping handler 110 creates a tenant specific decorating request/response object 304 based on the container status request/response object 302 for a tenant 104A in the expected tenant list 116. The container ping handler 110 isolates the underlying container status request/response object 302 from the tenant specific decorating request/response object 304 by resetting the internal status of the underlying container status request/response object 302. The internal status of the underlying container status request/response object 302 that is reset by the container ping handler 110 may, for example, include one or more of a Status, OutputStream and PrinterWriter internal statuses. The container ping handler 110 sends the tenant specific decorating request/response object 304 to the tenant 104A and receives a processed tenant specific decorating request/response object 306 from the tenant 104. The received processed tenant specific decorating request/response object 306 indicates the tenant health status 122 of the associated tenant 104A. The tenant health status 122 consists of either a tenant healthy status or a tenant unhealthy status. The container ping handler 110 repeats the process described above for each of the tenants 104A-104B in the expected tenant list 116.

The container ping handler 110 processes the container status request/response object 302 based on an aggregation of the plurality of processed tenant specific decorating request/response objects 304 and generates a container health status 124 based on the processed container status request/response object 302. If all of the tenant health statuses 122 received from the tenants 104A-104B on the expected tenant list 116 are tenant healthy statuses, the container ping handler 110 issues a container healthy status to the load balancer 106. If at least one of the tenant health statuses 122 received from the tenants 104A-104B on the expected tenant list 116 is a tenant unhealthy status, container ping handler 110 issues a container unhealthy status to the load balancer 106.

Figure 4:
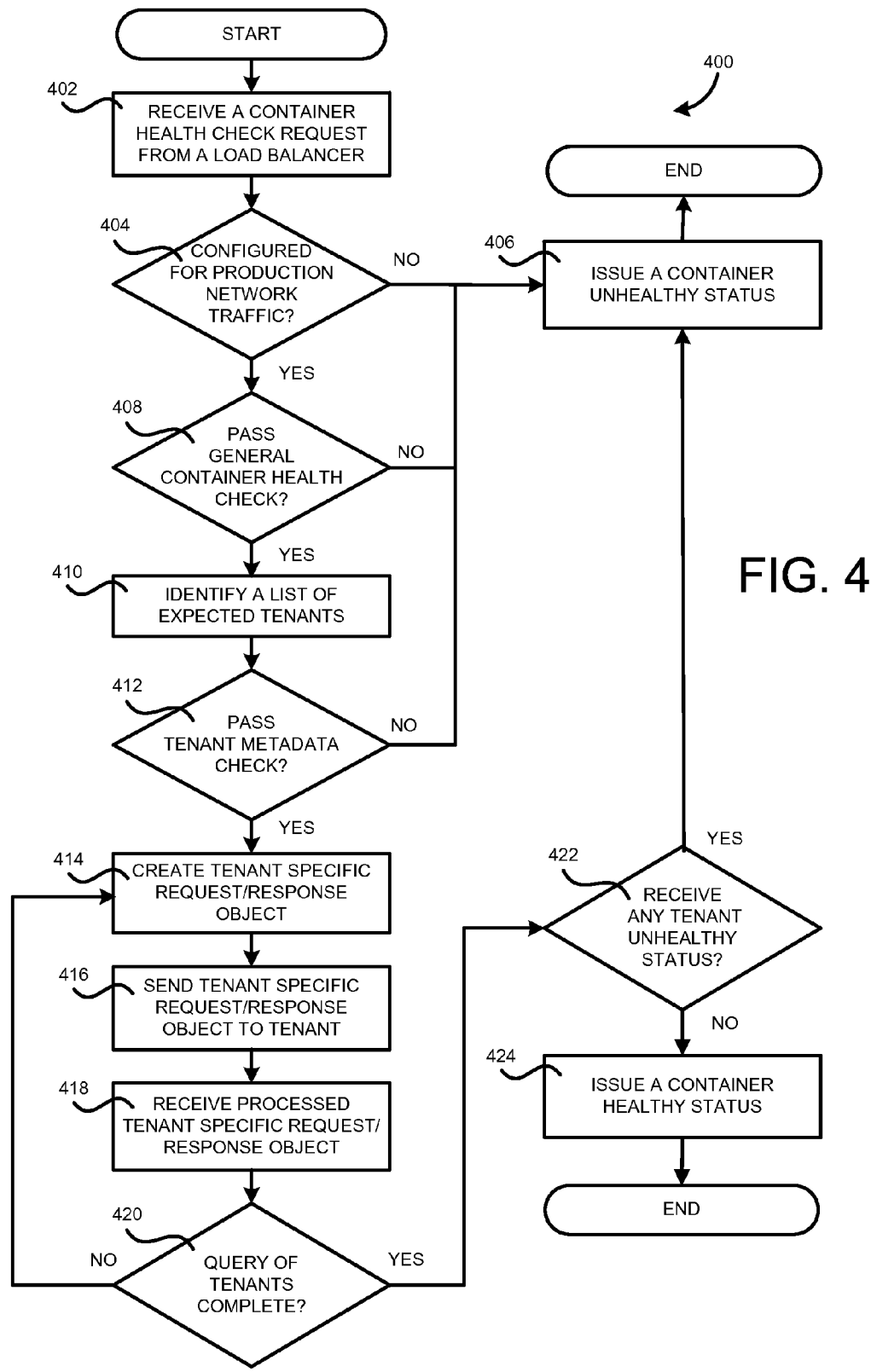
FIG. 4 is a flow diagram showing a routine that illustrates aspects of one mechanism disclosed herein for performing an aggregated health check of a multi-tenant service container.

FIG. 4 is a flow diagram showing a routine 400 that illustrates additional aspects of the mechanism shown in FIG. 1 for performing an aggregated health check of a multi-tenant service container 102. The routine 400 begins at operation 402, where the multi-tenant service container 102 receives a container health check request 112 from a load balancer 106. The container health check request 112 is received at the container ping handler 110. The routine 400 then proceeds from operation 402 to operation 404, where the container ping handler 110 determines whether the multi-tenant service container 102 is configured for production network traffic.

If the container ping handler 110 determines that the multi-tenant service container 102 is not configured for production network traffic, the routine 400 proceeds from operation 404 to operation 406, where the container ping handler 110 issues a container unhealthy status to the load balancer 106. If the container ping handler 110 determines that the multi-tenant service container 102 is configured for production network traffic, the routine 400 proceeds from operation 404 to operation 408.

The container ping handler 110 includes a general container health check module 114. At operation 408, general container health check module 114 performs a general container health check of the multi-tenant service container 102. If the multi-tenant service container 102 does not pass the general container health check, the routine 400 proceeds from operation 408 to operation 406, where the container ping handler 110 issues a container unhealthy status to the load balancer 106. If the multi-tenant service container 102 passes the general container health check, the routine 400 proceeds from operation 408 to operation 410.

At operation 410, the container ping handler 110 identifies the expected tenant list 116 for the multi-tenant service container 102. As discussed above, in one embodiment the expected tenant list 116 may be a list of all of the tenants 104A-104N cohosted by the multi-tenant service container 102. In another embodiment, the container health check request 112 may be associated with a specific process supported by the multi-tenant service container 102. In such a case, the expected tenant list 116 may be a list of the tenants 104A-104B cohosted by the multi-tenant service container 102 that support the process associated with the container health check request 112. For example, the expected tenant list 116 may be a subset of all of the tenants 104A-104B cohosted by the multi-tenant service container 102. In another embodiment, the multi-tenant service container 102 may support a number of interdependent processes and the expected tenant list 116 may include tenants that support one or more of the interdependent processes. In another embodiment, the list of tenants 104A-104B in the expectant tenant list 116 may be defined by the container health check request 112. In one embodiment, the expected tenant list 116 may be supplied to the multi-tenant service container 102. In another embodiment, the expected tenant list 116 may be stored at the multi-tenant service container 102.

From operation 410, the routine 400 proceeds to operation 412 where the container ping handler 110 checks tenant health metadata 118 associated with each of the tenants 104A-104B in the expected tenant list 116. A tenant 104A-104B in the expected tenant list 116 may fail the tenant health metadata check if the tenant 104A-104B has more than one live release. In another embodiment, a tenant 104A-104B in the expected tenant list 116 may fail the tenant health metadata check if the tenant 104A-104B is not hosted by the multi-tenant service container 102. If any one of the tenants 104A-104B on the expected tenant list 116 fails the tenant health metadata check, the routine 400 proceeds from operation 412 to operation 406 where the container ping handler 110 issues a container unhealthy status to the load balancer 106. If all of the tenants 104A-104B on the expected tenant list 116 pass the tenant health metadata check, the routine 400 proceeds from operation 412 to operation 414.

At operation 414, he container ping handler 110 creates a container status request/response object 302 in response to the container health check request 112. The container ping handler 110 creates a tenant specific decorating request/response object 304 based on the container status request/response object 302 for a tenant 104A in the expected tenant list 116. The container ping handler 110 isolates the underlying container status request/response object 302 from the tenant specific decorating request/response object 304 by resetting the internal status of the underlying container status request/response object 302. The internal status of the underlying container status request/response object 302 that is reset by the container ping handler 110 may, for example, include one or more of a Status, OutputStream and PrinterWriter internal statuses. The routine 400 then proceeds from operation 414 to operation 416.

At operation 416, the container ping handler 110 sends the tenant specific decorating request/response object 304 to the tenant 104A and at operation 418, the container ping handler 110 receives a processed tenant specific decorating request/response object 306 from the tenant 104A. The received processed tenant specific decorating request/response object 306 indicates the tenant health status 122 of the associated tenant 104A. The tenant health status 122 consists of either a tenant healthy status or a tenant unhealthy status. The container ping handler 110 receives a tenant unhealthy status from a tenant 104A if that tenant 104A has more than one live release.

The routine 400 then proceeds from operation 418 to operation 420, where the container ping handler 110 determines whether all of the tenants 104A-104B on the expected tenant list 116 have been queried regarding their tenant health status 122. If the container ping handler 110 determines that all of the tenants 104A-104B on the expected tenant list 116 have not been queried, the routine 400 proceeds from operation 420 to operation 414 where the container ping handler 110 repeats operations 414, 416 and 418 with the next tenant 104B on the expected tenants list 114. If the container ping handler 110 determines that all of the tenants 104A-104B on the expected tenant list 116 have been queried, the routine 400 proceeds from operation 420 to operation 422.

At operation 422, the container ping handler 110 processes the container status request/response object 302 based on an aggregation of all of the tenant health statuses 122 received from the tenants 104A-104B via the processed tenant specific request/response decorating objects 306 on the expected tenant list 116 and generates a container health status 124 based on the processed container status request/response object 302. If all of the tenant health statuses 122 received from the tenants 104A-104B on the expected tenant list 116 are tenant healthy statuses, the routine 400 proceeds from operation 422 to operation 424 and the container ping handler 110 processes the container status request/response object 302 accordingly and issues a container healthy status based on the processed container status request/response object to the load balancer 106.

If at least one of the tenant health statuses 122 received from the tenants 104A-104B on the expected tenant list 116 is a tenant unhealthy status, the routine 400 proceeds from operation 422 to operation 406 where the container ping handler 110 processes the container status request/response object 302 accordingly and issues a container unhealthy status based on the processed container status request/response object 302 to the load balancer 106.

Figure 5:
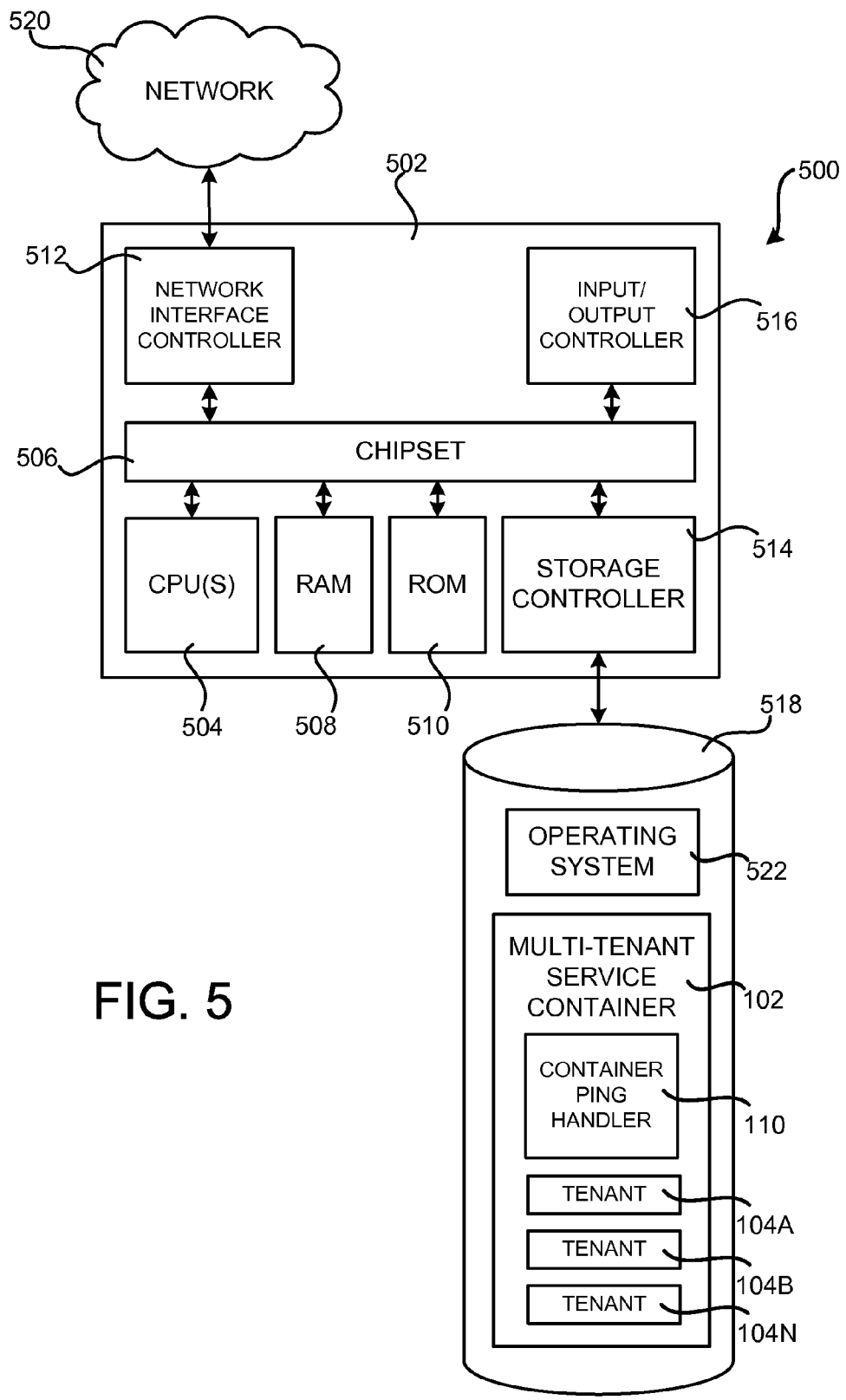
FIG. 5 is a computer architecture diagram showing an illustrative computer hardware architecture for computing devices described in embodiments presented herein.

FIG. 5 shows an example computer architecture for a computer 500 capable of executing the program components described above for performing an aggregated health check of a multi-tenant service container 102. The computer architecture shown in FIG. 5 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein.

The computer 500 includes a baseboard 502, or "motherboard," which is a printed circuit board to which a multitude of components or devices may be connected by way of a system bus or other electrical communication paths. In one illustrative embodiment, one or more central processing units ("CPUs") 504 operate in conjunction with a chipset 506. The CPUs 504 may be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 may provide an interface to a random access memory ("RAM") 508, used as the main memory in the computer 500. The chipset 506 may further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM may also store other software components necessary for the operation of the computer 500 in accordance with the embodiments described herein.

The computer 500 may operate in a networked environment using logical connections to remote computing devices and computer systems through a network, such as the local area network 520. The chipset 506 may include functionality for providing network connectivity through a NIC 512, such as a gigabit Ethernet adapter. The NIC 512 is capable of connecting the computer 500 to other computing devices over the network 520. It should be appreciated that multiple NICs 512 may be present in the computer 500, connecting the computer to other types of networks and remote computer systems.

The computer 500 may be connected to a mass storage device 518 that provides non-volatile storage for the computer. The mass storage device 518 may store system programs, application programs, other program modules, and data, which have been described in greater detail herein. The mass storage device 518 may be connected to the computer 500 through a storage controller 514 connected to the chipset 506. The mass storage device 518 may consist of one or more physical storage units. The storage controller 514 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 may store data on the mass storage device 518 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 518 is characterized as primary or secondary storage, and the like.

For example, the computer 500 may store information to the mass storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 may further read information from the mass storage device 518 by detecting the physical states or characteristics of one or more particular locations within the physical storage units.

In addition to the mass storage device 518 described above, the computer 500 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 500.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 518 may store an operating system 522 utilized to control the operation of the computer 500. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 518 may store other system or application programs and data utilized by the computer 500, such the multi-tenant service container 102, the container ping handler 110, and/or any of the other software components and data described above. The mass storage device 518 might also store other programs and data not specifically identified herein.

In one embodiment, the mass storage device 518 or other computer-readable storage media is encoded with computer-executable instructions which, when loaded into the computer 500, transforms the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various routines described above with regard to FIGS. 2 and 4. The computer 500 might also include computer-readable storage media for performing any of the other computer-implemented operations described herein.

The computer 500 may also include one or more input/output controllers 516 for receiving and processing input from a number of input devices, such as a keyboard, a mouse, a touchpad, a touch screen, an electronic stylus, or other type of input device. Similarly, the input/output controller 516 may provide output to a display, such as a computer monitor, a flat-panel display, a digital projector, a printer, a plotter, or other type of output device. It will be appreciated that the computer 500 may not include all of the components shown in FIG. 5, may include other components that are not explicitly shown in FIG. 5, or may utilize an architecture completely different than that shown in FIG. 5.

Based on the foregoing, it should be appreciated that technologies for modification of program code for execution in multi-tenant and/or distributed computing environments have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for performing an aggregated health check of a multi-tenant service container, the method comprising performing computer-implemented operations for:
    receiving a container health check request for a multi-tenant service container;
    determine whether the multi-tenant service container is configured for production network traffic;
    in response to determining that the multi-tenant service container is not configured for production network traffic, issue a container unhealthy status in response to the container health check request; and
    in response to determining that the multi-tenant service container is configured for production network traffic, creating a plurality of tenant specific decorating request/response objects, wherein individual ones of the plurality of tenant specific decorating request/response objects is associated with one of a plurality of tenants defined in a list of expected tenants hosted by the multi-tenant container;

sending individual ones of the plurality of tenant specific decorating request/response objects to an associated one of the plurality of tenants;

receiving a plurality of processed tenant specific decorating request/response objects from the plurality of tenants, individual ones of the plurality of processed tenant specific decorating request/response objects indicating a tenant health status of an associated tenant, wherein the tenant health status comprises one of a tenant healthy status or a tenant unhealthy status; and issuing a container health status of the multi-tenant service container, wherein the container health status comprises one of a container healthy status or a container unhealthy status determined based on an aggregation of the plurality of processed tenant specific decorating request/response objects.

2. The computer-implemented method of claim 1, wherein the list of expected tenants is defined by the container health check request.

3. The computer-implemented method of claim 1, wherein the list of expected tenants comprises all of the tenants hosted by the multi-tenant service container.

4. The computer-implemented method of claim 1, wherein the list of expected tenants comprises all of the tenants hosted by the multi-tenant service container that are associated with a process.

5. The computer-implemented method of claim 1, further comprising:

creating a container status request/response object in response to the container health check request;

creating the plurality of tenant specific decorating request/response objects based on the container status request/response object;

isolating the container status request/response object from the individual tenant specific decorating request/response objects;

processing the container status request/response object based on an aggregation of the plurality of processed tenant specific decorating request/response objects; and generating a container health status based on the processed container status request/response object.

6. The computer-implemented method of claim 1, wherein issuing a container health status of the multi-tenant service container, wherein the container health status consists of one of a container healthy status or a container unhealthy status based on an aggregation of the plurality of processed tenant specific decorating request/response objects, comprises:

issuing a container healthy status in response to a determination that the tenant health status received from the plurality of tenants is a healthy tenant status; and issuing a container unhealthy status in response to a determination that at least one of the tenant health statuses received from the plurality of tenants is a tenant unhealthy status.

7. The computer-implemented method of claim 1, further comprising:

performing a tenant health metadata check for tenants on the list of expected tenants; and issuing a container unhealthy status in response to a determination that at least one of the tenants on the expected tenant list fails the tenant metadata health check.

8. The computer-implemented method of claim 1, further comprising:

performing a general container health check; and issuing a container unhealthy status in response to a determination that the multi-tenant service container fails the general container health check.

9. A non-transitory computer-readable storage medium having computer-executable instructions stored thereupon which, when executed by a computer, causes the computer to:

receive a container health check request for a multi-tenant service container;

determine whether the multi-tenant service container is configured for production network traffic;

in response to determining that the multi-tenant service container is not configured for production network traffic, issue a container unhealthy status in response to the container health check request; and in response to determining that the multi-tenant service container is configured for production network traffic, issue a tenant health check request to a plurality of tenants defined in a list of expected tenants, wherein the multi-tenant service container is configured to host the plurality of tenants;

receive a tenant health status from individual ones of the plurality of tenants, the tenant health status comprising at least one of a tenant healthy status or a tenant unhealthy status; and issue a container health status of the multi-tenant service container based on the tenant health statuses received from the plurality of tenants, the container health status comprising at least one of a container healthy status or a container unhealthy status.

10. The non-transitory computer-readable storage medium of claim 9, wherein the list of expected tenants comprises a list of tenants defined by the container health check request.

11. The non-transitory computer-readable storage medium of claim 9, wherein the list of expected tenants comprises all of the tenants hosted by the multi-tenant service container.

12. The non-transitory computer-readable storage medium of claim 9, wherein the list of expected tenants comprises all of the tenants hosted by the multi-tenant service container that are associated with a process.

13. The non-transitory computer-readable storage medium of claim 9, wherein issue a container health status based on the tenant health status received from the plurality of tenants comprises:

issuing a container healthy status in response to a determination that the tenant health status received from the plurality of tenants is a healthy tenant status; and issuing a container unhealthy status in response to a determination that at least one of the tenant health statuses received from the plurality of tenants is a tenant unhealthy status.

14. The non-transitory computer-readable storage medium of claim 9, wherein receiving a tenant health status from the plurality of tenants comprises receiving a tenant unhealthy status from a tenant in response to a determination that the tenant fails a tenant ping health check.

15. The non-transitory computer-readable storage medium of claim 9, having further computer-executable instructions which, when executed by the computer, cause the computer to:

perform a tenant health metadata check for tenants on the expected tenant list; and issue a container unhealthy status in response to a determination that at least one of the tenants on the expected tenant list fails the tenant metadata health check.

16. The non-transitory computer-readable storage medium of claim 9, having further computer-executable instructions which, when executed by the computer, cause the computer to:
 perform a general container health check; and
 issue a container unhealthy status in response to a determination that the tenant service container fails the general container health check.

17. A computer-implemented method for performing an aggregated health check of a multi-tenant service container, the method comprising performing computer-implemented operations for:
 receiving a container health check request for the multi-tenant service container;
 determining whether the multi-tenant service container is configured for production network traffic;
 in response to determining that the multi-tenant service container is not configured for production network traffic, issuing a container unhealthy status in response to the container health check request; and
 in response to determining that the multi-tenant service container is configured for production network traffic,
  issuing a tenant health check request to a plurality of tenants defined in a list of expected tenants, wherein the multi-tenant service container is configured to host the plurality of tenants;
  receiving a tenant health status from the plurality of tenants, the tenant health status comprising at least one of a tenant healthy status or a tenant unhealthy status; and
  issuing a container health status of the multi-tenant service container based on the tenant health statuses received from the plurality of tenants, the container health status comprising at least one of a container healthy status or a container unhealthy status.

18. The computer-implemented method of claim 17, wherein the list of expected tenants comprises a list of tenants defined by the container health check request.

19. The computer-implemented method of claim 17, wherein the list of expected tenants comprises all of the tenants hosted by the multi-tenant service container.

20. The computer-implemented method of claim 17, wherein the list of expected tenants comprises all of the tenants hosted by the multi-tenant service container that are associated with a process.

21. The computer-implemented method of claim 17, wherein issuing a container health status based on the tenant health status received from the plurality of tenants comprises:
 issuing a container healthy status in response to a determination that the tenant health status received from the plurality of tenants is a healthy tenant status; and
 issuing a container unhealthy status in response to a determination that at least one of the tenant health statuses received from the plurality of tenants is a tenant unhealthy status.

22. The computer-implemented method of claim 17, wherein receiving a tenant health status from the plurality of tenants comprises receiving a tenant unhealthy status from a tenant in response to a determination that the tenant fails a tenant ping health check.

23. The computer-implemented method of claim 17, further comprising:
 performing a tenant health metadata check for tenants on the expected tenant list; and
 issuing a container unhealthy status in response to a determination that at least one of the tenants on the expected tenant list fails the tenant metadata health check.

24. The computer-implemented method of claim 17, further comprising:
 performing a general container health check; and
 issuing a container unhealthy status in response to a determination that the multi-tenant service container fails the general container health check.

* * * * *